No. 752,942. PATENTED FEB. 23, 1904.
J. W. ACHARD.
END CELL SWITCH.
APPLICATION FILED MAY 17, 1902.
NO MODEL. 2 SHEETS—SHEET 2.
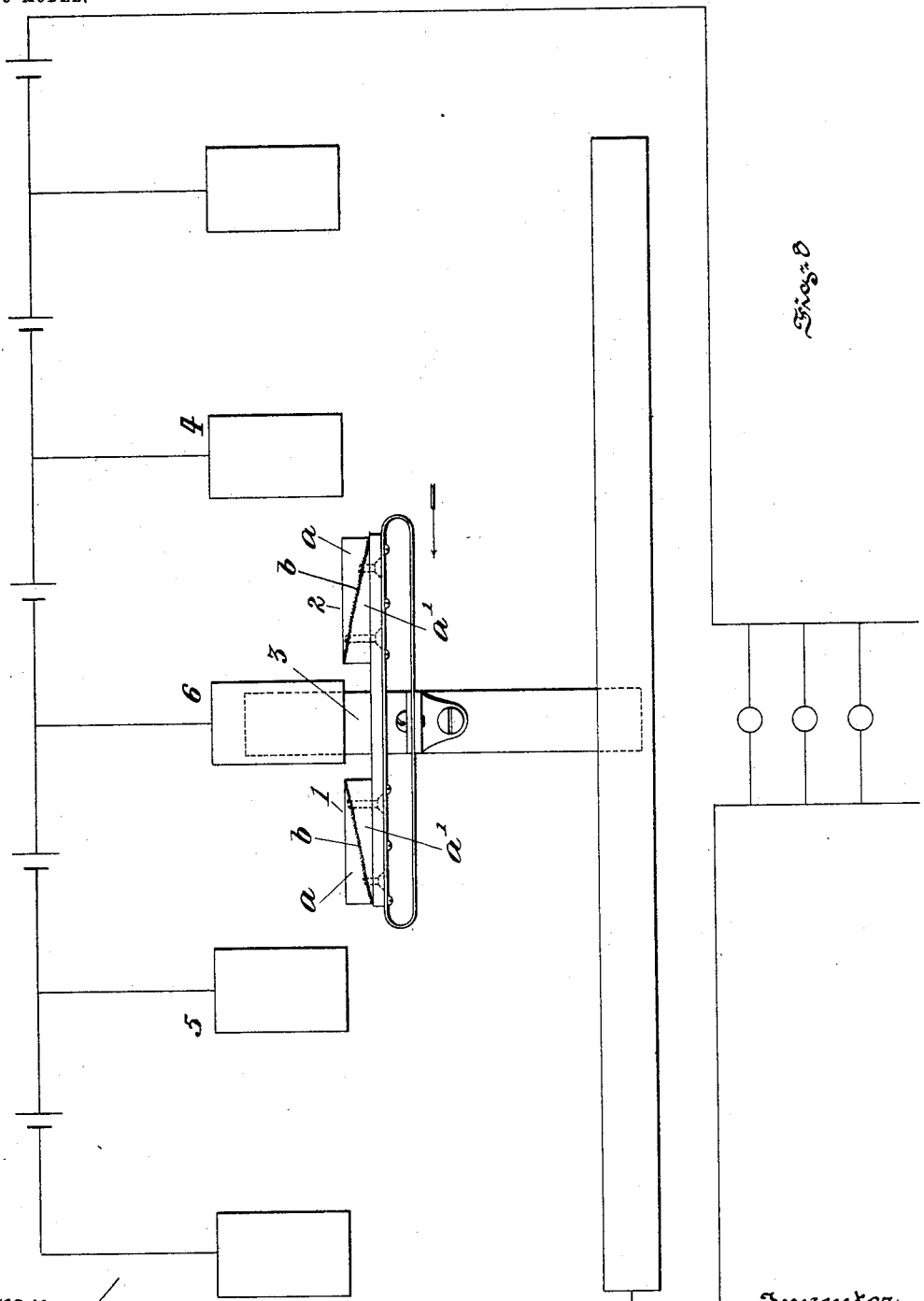

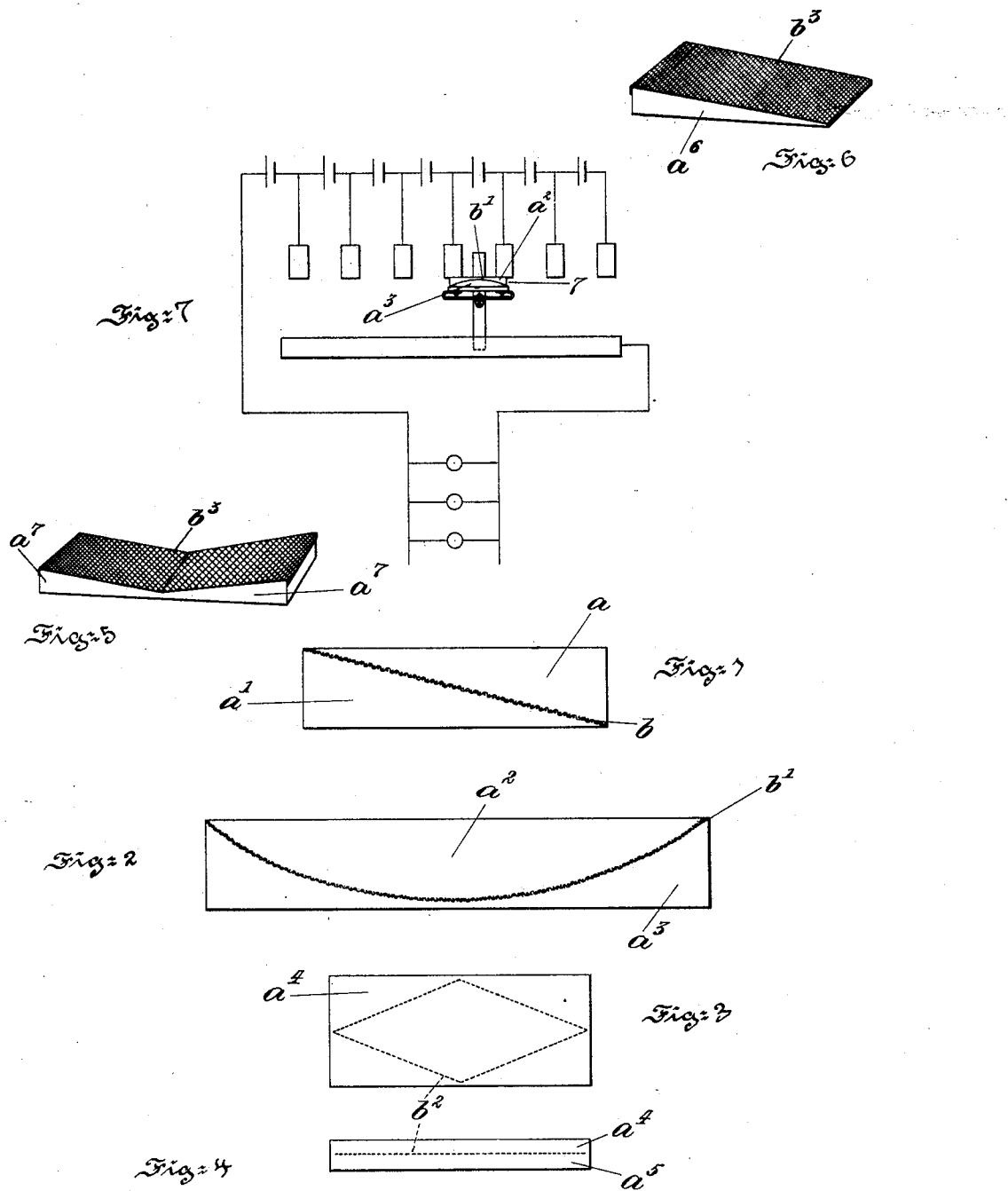

No. 752,942. Patented February 23, 1904.

UNITED STATES PATENT OFFICE.

JOHN W. ACHARD, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

END-CELL SWITCH.

SPECIFICATION forming part of Letters Patent No. 752,942, dated February 23, 1904.

Application filed May 17, 1902. Serial No. 107,755. (No model.)

*To all whom it may concern:*

Be it known that I, JOHN W. ACHARD, a citizen of the United States, residing at Philadelphia, in the county of Philadelphia and State of Pennsylvania, have invented certain new and useful Improvements in End-Cell Switches, of which the following is a specification.

The present invention relates to end-cell switches; and it concerns more particularly improvements in the carbon brush or brushes which are used as auxiliaries to the main brush in establishing and disestablishing the circuit with the various contacts of the switch.

The principal object of the present invention is to prevent sparking at the brushes; and to this and other ends hereinafter set forth the invention, stated in general terms, comprises an end-cell switch provided with an auxiliary brush consisting of carbon and a conductor combined and operating to increase and diminish the resistance throughout different portions of the auxiliary brush; and the invention also comprises the improvements hereinafter described and claimed.

The nature, characteristic features, and scope of the invention will be more fully understood from the following description, taken in connection with the accompanying drawings, forming part hereof, and in which—

Figure 1 is an edge view of an auxiliary brush embodying features of the invention. Fig. 2 is a similar view illustrating an auxiliary brush embodying a modification of the invention. Figs. 3 and 4 are respectively a plan and an edge view of an auxiliary brush embodying a further modification of the invention. Figs. 5 and 6 are side views illustrating further modifications in which the conductor is applied facially to the carbon, and Figs. 7 and 8 are views illustrating some of the brushes of the invention in application to an end-cell switch.

Referring to the drawings, and more especially to Fig. 1, $a$ and $a'$ are sections of carbon which make up the auxiliary brush, and between them there is a metallic conductor, as metal gauze $b$. The gauze is arranged diagonally of the brush for a purpose to be presently described. In Fig. 2 the sections $a^2$ and $a^3$ meet on a curved line and the gauze or conductor $b'$ is interposed between them. As shown in Figs. 3 and 4, the sections $a^4$ and $a^5$ meet on a straight line and the gauze $b^2$ is tapered at its ends and is placed between the sections. As shown in Figs. 5 and 6, $a^6$ and $a^7$ are wedge-shaped carbons and the conductor, as gauze $b^3$, is applied facially. As shown in Fig. 8, two carbon brushes 1 and 2 are placed one on each side of the main brush 3 and the described arrangement of the gauze in respect to the carbon in all of the brushes is such that the resistance of the brush varies from place to place throughout its length. The resistance between the contacts of the switch on which a carbon and a main brush rests increases while the carbon slides off the contact, and thereby prevents sparking at the carbon, and when the main brush slips off a contact the resistance at the carbon is so low that there will be no sparking at the main brush. For example, referring to Fig. 8, as the carbon-brush 2 was traveling toward the left and left the contact 4 its resistance was comparatively high, because its gauze or conductor was comparatively remote from its surface which bore upon the contact—that is to say, the current had to traverse considerable carbon, and therefore the resistance was high and sparking was prevented. As the brushes continue to travel toward the left the brush 1 will reach the contact 5, the main brush 3 will slip off the contact 6, but prior to that the brush 2 will have to slide onto the contact 6, and in doing so the resistance of the brush 2 is low, because its gauze is near to that part of its surface which touches the contact 6, and since its resistance is low it will carry considerable current, so that when the main brush leaves the contact 6 there will be no sparking.

Referring to Fig. 7, there is illustrated a single carbon brush 7, like the one shown in Fig. 2, and since its gauze is arranged as described its resistance will vary, and as it travels along the contacts sparking will be prevented in the manner described with reference to Fig. 8.

The brush shown in Figs. 3 and 4, by reason of the shape of the gauze, which is wider at its middle than at its ends, operates in the same way as the brush shown in Fig. 2.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. The herein-described brush consisting of carbon and an embedded conductor arranged transversely of the brush and which operates to decrease and increase the resistance of the brush throughout its depth, substantially as set forth.

2. The herein-described brush consisting of carbon and an embedded metallic conductor arranged transversely of the brush and which operates to decrease and increase the resistance of the brush throughout its depth, substantially as set forth.

3. In an end-cell switch the combination of a main brush, contacts, and an auxiliary brush having different resistances throughout its length and consisting of carbon and a metallic conductor, substantially as described.

4. The combination of a main brush, contacts, and an auxiliary brush consisting of carbon having embedded in it a conductor which lies nearer its surface at some points than at others, substantially as described.

In testimony whereof I have hereunto signed my name.

JOHN W. ACHARD.

In presence of—
W. J. JACKSON,
FRANK T. KALAS.